(12) United States Patent
Ma et al.

(10) Patent No.: US 7,323,208 B2
(45) Date of Patent: Jan. 29, 2008

(54) MODIFIED POROUS MATERIALS AND METHOD OF FORMING THE SAME

(75) Inventors: Peter X. Ma, Ann Arbor, MI (US); Xiaohua Liu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 179 days.

(21) Appl. No.: 10/999,459

(22) Filed: Nov. 30, 2004

(65) Prior Publication Data
US 2006/0115644 A1   Jun. 1, 2006

(51) Int. Cl.
*B05D 5/00* (2006.01)
(52) U.S. Cl. .............. 427/2.1; 427/2.24; 427/2.25; 427/2.26; 427/2.27; 427/2.31
(58) Field of Classification Search .............. None
See application file for complete search history.

(56) References Cited

U.S. PATENT DOCUMENTS 6,146,892 A   11/2000  Ma et al.
6,673,285 B2   1/2004  Ma

FOREIGN PATENT DOCUMENTS

| CN | 1389481 | * | 1/2003 |
|----|---------|---|--------|
| JP | 2182259 |   | 7/1990 |

OTHER PUBLICATIONS

Cui et al, Journal of Biomedical Materials Research Part A, 66A (4), pp. 770-778, published online Aug. 2003.*
Chen et al, Advanced Materials, 12(6), pp. 455-457, 2000.*
Ma, P.X. and J. Choi, "Biodegradable Polymer Scaffolds with Well-Defined Interconnected Spherical Pore Network," Tissue Engineering 2001;7(1): pp. 23-33.
Ma, P.X. and R. Zhang, "Synthetic nano-scale fibrous extracellular matrix," J Biomed Mater Res 1999;46(1): pp. 60-72.
Zhang, R. and P.X. Ma, "Synthetic nano-fibrillar extracellular matrices with predesigned macroporous architectures," J Biomed Mater Res 2000;52(2):pp. 430-438.
International Search Report for S.N. PCT/US2004/040011 dated Jan. 19, 2006 (15 pages).

* cited by examiner

*Primary Examiner*—Erma Cameron
(74) *Attorney, Agent, or Firm*—Dierker & Associates, P.C.

(57) ABSTRACT

Modified porous materials are disclosed having interconnected, complexly shaped three-dimensional surfaces. The modification is accomplished by crosslinking the three-dimensional surfaces and/or by coating the three-dimensional surfaces with a layer of a predetermined material. The porous materials are macro structures including at least one of nano-features, micro-features, and combinations thereof. The modifying accomplishes changing surface properties of the porous materials, changing the three-dimensional surfaces, and/or rendering the porous materials substantially stable in a predetermined environment.

24 Claims, 10 Drawing Sheets

MODIFIED POROUS MATERIALS AND METHOD OF FORMING THE SAME

STATEMENT REGARDING FEDERALLY SPONSORED RESEARCH OR DEVELOPMENT

This invention was made in the course of research partially supported by grants from the National Institutes of Health, Grant Numbers DE014755 and DE015384. The U.S. government has certain rights in the invention.

BACKGROUND

The present disclosure relates generally to porous materials, and more particularly to modified porous materials and method(s) of forming the same.

Porous materials are widely used in biomedical, industrial, and household applications. In the biomedical field, porous materials have been used as scaffolds (templates) for tissue engineering/regeneration, wound dressings, drug release matrices, membranes for separations and filtration, sterile filters, artificial kidneys, absorbents, hemostatic devices, and the like. In various industrial and household applications, porous materials have been used as insulating materials, packaging materials, impact absorbers, liquid or gas absorbents, membranes, filters and so forth.

However, many porous materials may be useful in only certain limited environments. For example, porous polymer materials may be used as scaffolds for cell incorporation, proliferation and tissue regeneration in aqueous environments (such as in a tissue culture medium, in a bioreactor, or implanted inside a human or animal body). Yet, such a polymer often cannot be used for other applications that involve the use of certain organic solvents that dissolve or significantly change the physical form and properties of the polymer. Similarly, a porous material made of a water-soluble polymer, natural macromolecule, or inorganic compound may work well in air, an organic solvent, or certain solutions; yet, it may not maintain its structure and function in an aqueous environment because it dissolves or seriously deforms in water or aqueous solutions. Many porous metallic materials (pure metals or alloys) may also deleteriously dissolve in, rust in, or react with certain aqueous or organic solvents, which may lead to a variety of problems.

Thus, it would be desirable to provide porous materials which may be used in varied predetermined environments.

SUMMARY

Modifying porous materials are disclosed having interconnected, complexly shaped three-dimensional surfaces. The modification is accomplished by crosslinking the three-dimensional surfaces and/or by coating the three-dimensional surfaces with a layer of a predetermined material. The porous materials are macro structures including at least one of nano-features, micro-features, and combinations thereof. The modifying accomplishes changing surface properties of the porous materials, changing the three-dimensional surfaces, and/or rendering the porous materials substantially stable in a predetermined environment.

BRIEF DESCRIPTION OF THE DRAWINGS

Objects, features and advantages will become apparent by reference to the following detailed description and drawings, in which.

DETAILED DESCRIPTION

Figure 1:
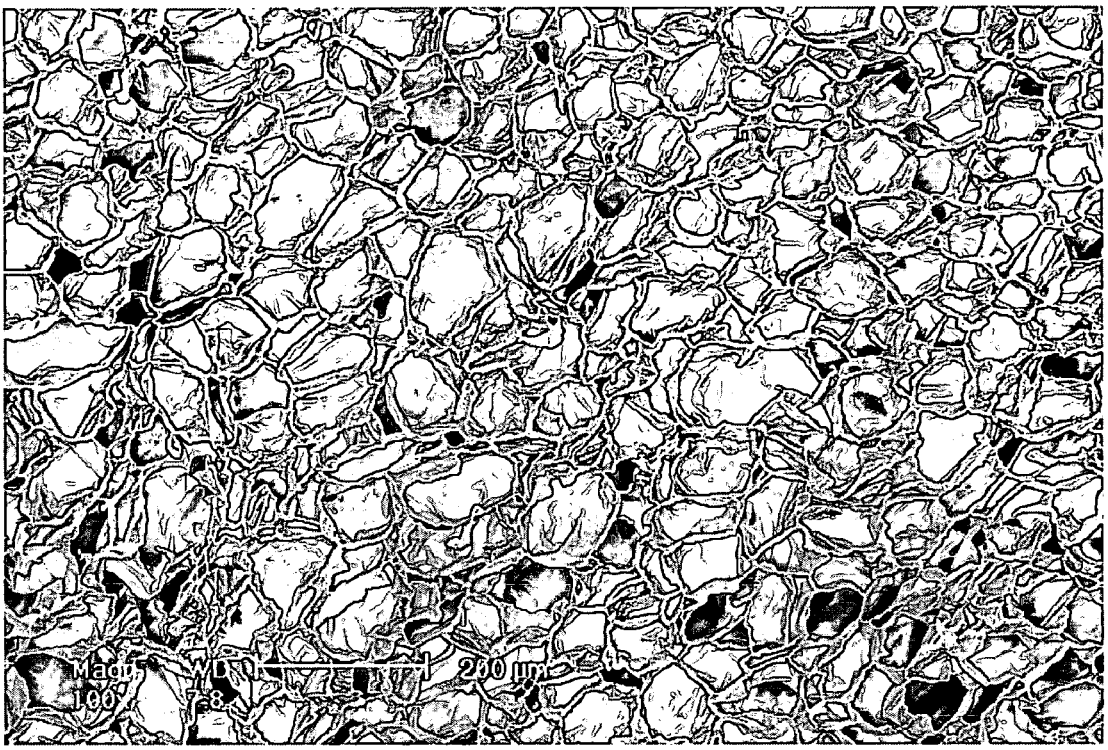
FIG. 1 is a SEM micrograph of a porous material formed from a 2% gelatin solution in water, dissolved at 50° C. and gelled at −76° C.

It has been unexpectedly and fortuitously discovered that porous materials having interconnected, complexly shaped three-dimensional surfaces may be advantageously modified so as to stabilize the porous materials in a predetermined environment, to modify the surfaces thereof, to change the surface (physical) properties, and/or to change the biological properties. It is to be understood that the complexly shaped surfaces may be any suitable shape, as long as the pores are interconnected. Some suitable non-limitative examples of 3-D pores forming the surfaces include spherical, cubical, square, channels (any shape, such as cylindrical channels, for example), and any other suitable geometries, including regular and/or non-regular.

The porous materials may be modified/stabilized by crosslinking the three-dimensional surfaces and/or by coating the three-dimensional surfaces with a layer of a predetermined material. Further, if a coating is used, the coating may optionally be crosslinked, if desired for a particular end use. It is to be understood that the crosslinking may be achieved via covalent bond formation and/or ionic bond formation.

In an embodiment, the porous materials are macro structures including nano-features, micro-features, and/or combinations thereof. It is to be understood that, as defined herein, nano-features are intended to include features ranging in size between about $10^{-10}$ meters and about $10^{-6}$ meters; and micro-features are intended to include features ranging in size between about $10^{-6}$ meters and about $10^{-3}$ meters.

The modifying/stabilizing may be accomplished by crosslinking. Further, it is to be understood that the crosslinking density may be varied in a manner sufficient to achieve predetermined physical and/or biological properties. Some non-limitative examples of physical properties include, but are not limited to mechanical properties, swelling properties, and/or surface properties (e.g. hydrophilicity/hydrophobicity). A non-limitative example of a biological property is cell interaction with the porous materials.

It is to be understood that if the porous materials are coated, they may be coated with one or more layers. It is to be further understood that if there is more than one layer, the layers may completely or substantially completely overlie one another, or they may partially contact one another. Yet further, it is to be understood that each individual coating layer may range in thickness between about $10^{-10}$ meters and about $10^{-3}$ meters. In an embodiment, each coating layer may range in thickness between about $10^{-9}$ meters and about $10^{-6}$ meters.

The porous materials in any of the embodiments disclosed herein may be formed from at least one of synthetic macromolecules; natural macromolecules; substantially non-macromolecular materials; natural macromolecule-containing materials; synthetic macromolecule-containing materials; oligomeric materials; fragments of macromolecules; macromolecule-containing composites; and mixtures thereof.

It is to be understood that, as defined herein, "macromolecule" is intended to include large molecules without repeating units, polymeric materials (i.e. large molecules with repeating units), co-polymers, and combinations thereof. Further, various non-limitative examples of some specific macromolecules, polymers, and monomers useful for forming polymers are given hereinbelow.

In an embodiment, the natural macromolecules are proteins, carbohydrates, lipids, derivatives thereof, denatured forms thereof, modified forms thereof, fragments thereof, and/or mixtures thereof. Some non-limitative examples of derivatives, modified forms and/or denatured forms include gelatin (a denatured protein that is a derivative of collagen).

Examples of suitable cell interactive materials which may be used as the porous materials and/or as coating materials include, but are not limited to fibronectin; vitronectin, other members of the pexin family, laminin, hyaluronate, chitosan, alginates, polypeptides, peptides (for example, RGD peptides), and/or the like.

It is to be understood that macromolecule-containing composites have macromolecules as a major component thereof. Other components may include ceramic materials, metal materials, small molecules, inert additives, active additives, and/or mixtures thereof. Some non-limitative examples of additives include pigments, surfactants, adhesion enhancers, predetermined ingredient-releasing enhancers, bioactive agents (for example, growth factors and hormones).

The substantially non-macromolecular materials may be ceramic materials, metallic materials, and/or mixtures thereof. It is to be understood that the ceramic materials in the composites and/or in the non-macromolecular materials may be any suitable ceramic materials. Some non-limitative examples of suitable ceramic materials include alpha- or beta-TCP (tri calcium phosphate), hydroxyapatite (HAP); carbonated HAP; bioglasses; oxides; and/or combinations thereof.

It is to be understood that the metal materials in the composites and/or in the non-macromolecular materials may be any suitable metal materials. Some non-limitative examples of suitable metal materials include stainless steel, titanium, base alloys such as chromium alloys, cobalt alloys, titanium alloys, gold, noble alloys, and/or the like, and/or mixtures thereof.

When the porous materials are coated, it is to be understood that the coating may be accomplished by any suitable means, including but not limited to mechanical application, thermal application, adhering, self-assembling, molecular entrapment, chemical bonding, and/or combinations thereof. Non-limitative methods of coating are discussed further hereinbelow. Further, it is to be understood that when a coating is used, the coating may be formed from the same, a similar, or different material from that of the porous materials.

It is to be understood that porous materials may be made of synthetic polymers, natural macromolecules, inorganic compounds, ceramic or metallic materials. These porous materials can be made using many different fabrication technologies, including sintering, stretching, extrusion, self-assembly, phase inversion, phase separation, porogen-leaching, gas-foaming, etching, casting, and solid free form fabrication techniques (computer-assisted design and computer-assisted manufacture, i.e., CAD-CAM. See, for example, the inventor's recent publications in this regard: Ma, P. X. (2004), "Scaffolds for tissue fabrication," *Materials Today* 7, 30-40; and Ma, P. X. (2004), "Tissue Engineering," In *Encyclopedia of Polymer Science and Technology*, Kroschwitz, J. I., ed. (Hoboken, N.J., John Wiley & Sons, Inc.)

The porous materials may also be formed from biodegradable materials suitable for tissue regeneration. Some non-limitative examples of such biodegradable materials include poly(L-lactic acid) (PLLA), polyglycolic acid (PGA), poly(lactide-co-glycolide) (PLGA), and/or mixtures thereof.

It is to be understood that the coating may be formed of any suitable material (many examples are listed hereinbelow). In a non-limitative embodiment, the coating is formed from gelatin, vitronectin, fibronectin, laminin, peptides, polypeptides, chitosan, hyaluronate, alginates, and/or mixtures thereof.

As discussed above, the present disclosure concerns fabrication and methods of stabilizing/modifying nano- (size scale $10^{-9}$-$10^{-6}$ m) and/or micro- (size scale $10^{-6}$-$10^{-3}$ m) structures, as well as the macro-structures ($\geqq 10^{-3}$ m) of porous materials. Specifically, interconnected complex shaped 3D surfaces of the porous materials are crosslinked via chemical (either covalent or ionic) bond formation, or are coated with a very thin layer(s) of a material(s) that is stable in the service environment to maintain the nano-/micro-features as well as the macro-structure. The crosslinking density may also be tailored to achieve desired mechanical, swelling and/or other physical properties. At least two different embodiments are disclosed to achieve the stabilization/modification of such complex 3D surfaces.

One embodiment is to "directly" crosslink the surfaces of a porous material, for example, if it is made of a synthetic polymer (including polymers of multiple types of monomers, a mixture of polymers, a polymer-containing composite, i.e., at least one of the components of the porous material is a polymer; a natural macromolecule (such as proteins, carbohydrates, lipids, their derivatives including denatured forms, modified forms, fragments, and any combinations of them), a mixture of macromolecules, and/or a macromolecule-containing composite, i.e., at least one of the components of the porous material is a naturally derived macromolecule.

A second embodiment is to coat the 3D complex-shaped surfaces of the interconnected porous materials with a composition containing at least one polymer or macromolecule if the coating itself is substantially stable under the service environment. If the coating itself is not substantially stable under the service environment, the coating composition may then be crosslinked (termed "indirect" crosslinking). Here, the initial porous materials may be polymer/macromolecule-free (such as a ceramic or metallic structures), polymer/macromolecule-containing, substantially polymeric/macromolecular, or entirely polymeric/macromolecular materials.

In the above-described systems, the polymer/macromolecule may actually be a smaller molecule than a normal polymer or macromolecule, such as an oligomer or a fragment of a natural macromolecule. There also may be variations of the above-described systems. For example, the polymer can actually be synthesized in situ using monomers and other chemicals such as initiators and/or solvents, etc.

When coatings are used, they may be mechanically or thermally applied, physically adhered (via van der Waals, hydrogen-bond, and electrostatic interactions; mechanically entangled or restricted), self-assembled, molecularly entrapped (interpenetrated), and/or chemically bonded to the complex-shaped 3D surfaces of the porous materials. The coating formulation generally does not substantially dissolve or seriously deform the porous materials in an undesired way.

As examples for the first type of systems ("directly crosslinking"), porous gelatin materials having nano-fibrous structure, or nano-fibrous structure with micro- to macro-level pores were fabricated. The nano-fibrous feature is maintained or substantially maintained along with the micro- or/and macro-porous structure by using crosslinking reagents in a suitable solvent (solvent mixture), which may allow certain level(s) of molecular motion and chemical reactions to occur.

As examples for the second type of systems (stable coating or "indirect" crosslinking), PLLA nano-fibrous materials with or without designed micro- or/and macro-pores were used. These porous PLLA materials are coated with a composition (e.g., gelatin) different from the porous material (PLLA). If the coating itself is not stable under the service environment, the coating material is then crosslinked. These coated materials can protect the base materials from destruction or deformation under certain environments (e.g., in an organic solvent for PLLA). In some cases, these coating materials themselves or incorporated additives could have certain other functions (such as physical or biological functions, including improving cellular interactions and releasing drugs or biological factors).

The polymers and macromolecules that may be used as the porous materials and/or coating materials in accordance with the present disclosure are numerous. Some exemplary, non-limitative water insoluble (hydrophobic) polymers/macromolecules that are suitable for the porous materials and/or for coating on hydrophilic porous materials include at least one of polytetrafluoroethylene (PTFE), polyvinylchloride (PVC), polyethylenes (PE), polypropylenes (PP), polystyrenes, polyacrylonitrile (PAN), polymethylmethacrylate (PMMA), polyvinylacetate (PVAc), polyphenylene oxide, polypropylene oxide (PPO), polyvinylidene fluoride (PVDF), polybutylene, polyamides (PA, Nylons), polyesters, polycarbonates, polyurethanes, polysiloxanes, polyimides, polyetheretherketone (PEEK), polysulfones, polyethersulphone, cellulose and its derivatives, and mixtures thereof.

When in situ polymerization is used instead of polymers/macromolecules to form porous materials and/or coatings, some exemplary suitable hydrophobic unsaturated monomers include, but are not limited to the following: at least one of acrylates, methacrylates (eg. methyl methacrylate), ethylene, propylene, tetra-fluoroethylene, styrene, vinyl chloride, vinylidene chloride, vinyl acetate, acrylonitrile, 2,2-bis[4-(2-hydroxy-3-methacryloyloxy-propyloxy)-phenyl]propane (Bis-GMA), ethyleneglycol dimethacrylate (EGDMA), tri-ethyleneglycol dimethacrylate (TEGDMA), bis(2-methacryly-oxyethyl)ester of isophthalic acid (MEI), bis(2-meth-acrylyoxyethyl)ester of terephthalic acid (MET), bis(2-methacrylyoxyethyl)ester of phthalic acid (MEP), 2,2-bis(4-methacrylyoxy phenyl)propane (BisMA), 2,2-bis[4-(2-methacrylyloxyethoxy)phenyl]propane (BisEMA), 2,2-bis[4-(3-methacrylyloxy-propoxy)phenyl]propane (BisPMA), hexafluoro-1,5-pentanediol dimethacrylate (HFPDMA), bis-(2-methacrylyloxyethoxy-hexafluoro-2-propyl)benzene [Bis(MEHFP)ϕ], 1,6-bis(methacrylyloxy-2-ethoxycarbonylamino)-2,4,4-tri-methylhexan (UEDMA), spiro orthocarbonates, other vinyl monomers, the derivatives of these monomers, and mixtures thereof.

Monomers of condensation polymers can also be used to form porous materials and/or coatings in situ. Some non-limitative monomer types in this category are diacids and diols (pairs), ω-hydroxy carboxylic acids, lactones, diacids and diamines (pairs), amino acids, lactams, diisocyanates and diols (pairs), and mixtures thereof.

Certain biodegradable polymers and macromolecules may also be used as the porous materials and/or coatings, for example, when controlled release properties are desired. Some exemplary, non-limitative biodegradable polymers include at least one of poly(lactide-co-glycolide) (PLGA), poly(L-lactic acid) (PLLA), poly(D,L-lactic acid) (PDLLA), polyglycolic acid (PGA), polyanhydrides, poly(ortho ethers), poly(ε-caprolactone) (PCL), poly(hydroxy butyrate) (PHB), poly(propylene fumarate) (PPF), polyphosphoesters (PPE), polyphosphazenes, and mixtures thereof. Further suitable non-limitative examples include degradable natural macromolecules (typically enzymatically degradable) such as collagen, gelatin, and many other proteins, carbohydrates, and their derivatives.

Some exemplary, non-limitative water-soluble (hydrophilic) polymers/macromolecules that are suitable for the porous materials and/or for coating on hydrophobic porous materials include polyvinyl alcohol, polyethylene oxide (polyethylene glycol), polymethacrylic acid (PMAA), polyvinyl pyrolidone, polyacrylic acid, poly(lysine), poly(allylamine), poly(ethylenimine), poly(acrylamide), poly(acrylamide-co-arylic acid), poly(acrylamide-co-diallyldimethylammonium chloride), poly(vinyl alcohol), poly(ethylene glycol), polyethylene-block-poly(ethylene glycol), poly(propylene glycol), poly(2-hydroxypropyl methacrylate), poly(2-hydroxyethyl methyacrylate), poly(4-hydroxystrene), polyethylene monoalcohol, poly(vinyl alcohol-co-ethylene), poly(styrene-co-allyl alcohol), hydroxyethylcellulose, alginate, pectin, chitin, chitosan, dextran, hyaluronic acid, collagen, gelatin, and mixtures thereof.

Certain such polymers/macromolecules may also be synthesized in situ to form porous materials and/or coatings. Some non-limitative examples of suitable acid-containing hydrophilic monomers include at least one of monomers containing carboxylic acid: acrylic acid, methacrylic acid, 4-vinylbenzoic acid, crotonic acid, oleic acid, elaidic acid, itaconic acid, maleic acid, fumaric acid, acetylenedicarboxylic acid, tricarbollylic acid, sorbic acid, linoleic acid, linolenic acid, eicosapentenoic acid, other unsaturated carboxylic acids, anhydrides, their derivatives, and/or mixtures thereof; and/or other organic acids such as sulfonic acid, and/or phosphonic acid replacement of the carboxyl group of the above listed unsaturated carboxylic acids, their derivatives, and/or mixtures thereof.

Some non-limitative suitable amine-containing hydrophilic monomers include at least one of allylmine, 4-vinylaniline, L-lysine, D-lysine, DL-lysine, acrylamide, derivatives thereof, and mixtures thereof. Some exemplary suitable hydroxyl-containing hydrophilic monomers include, but are not limited to 2-hydroxypropyl methacrylate, 2-hydroxyethyl methacrylate, 4-hydroxystrene, ethylene glycol, propylene glycol, derivatives thereof, and/or mixtures thereof.

Poly(ethylene glycol)acrylate, poly(ethylene glycol) methacrylate, and/or mixtures thereof may also be used to form porous materials and/or coatings.

Many natural macromolecules and synthetic polymers can be both hydrophilic and hydrophobic (amphiphilic). They could also be used to form porous materials and/or for certain coating applications. Non-limitative examples of these materials include those containing acid, amine, hydroxyl, or/and other hydrophilic groups in some and/or all of their structural units. Many of them may be copolymers in some way, containing both hydrophilic and hydrophobic moieties.

For many of the examples given above, there may be specific crosslinking agent(s) to crosslink, if desired. Some exemplary crosslinking agents include, but are not limited to ethyl-3-(3-dimethylaminopropyl)carbodiimide HCl (EDC), dialdehydes (e.g. glutaraldehyde), ethylene glycol dimethacrylate, N,N-methylenebisacrylamide, 1,6-hexamethylenediisocyanate, divinylsulfone, 1,6-hexanedibromide, PEG diacrylate, PEG dimethacrylate, dextramethacrylate, and/or mixtures thereof.

It is to be understood that, for any of the examples of macromolecules/polymers mentioned herein, other suitable non-limitative examples include oligomers of any of those macromolecules/polymers, and/or fragments of any of those macromolecules/polymers.

To illustrate the present disclosure, the following examples are provided. However, these examples are intended to be illustrative and should not be considered to limit the scope of the present disclosure.

EXAMPLES

Example 1

Preparation of Porous Gelatin Materials

Gelatin was dissolved in ethanol/water (or water, methanol/water, dioxane/water, acetone/water) solvent mixtures to form gelatin solutions of different concentrations (from 2% (m/v) to 20% (m/v)). The stock gelatin solution was stored in a water bath to maintain at a desired temperature (40° C. to 80° C.). 2 mL gelatin solution was added to a Teflon vial (cylindrical in shape with a diameter of 18 mm) and capped. The Teflon vial with gelatin solution was quickly transferred to a freezer at −76° C., −18° C., 4° C., or left at room temperature. The gelatin solution was maintained at the desired temperature (gel formation) for at least 4 hours. The gelatin gels were soaked in 50 mL cold ethanol (−18° C.) for 24 h (for ethanol/water system). The gels were then transferred into 50 mL dioxane for solvent exchange (for ethano/water, methano/water, and acetone/water systems). Dioxane on the surface of the gelatin gel was wiped with blotting paper, and the gel was frozen at −18° C. for at least 12 h. The gel was freeze-dried in an ice/salt bath at −5° C. to −10° C. for one week.

Example 2

Preparation of Nano-Fibrous and
Macro/Micro-Porous Gelatin Materials

Macro/micro-porous and nano-fibrous gelatin materials (scaffolds) were fabricated by combining particulate-leaching and phase-separation techniques. Paraffin spheres were prepared as reported at Ma, P. X. and Choi J. "Biodegradable polymer scaffolds with well-defined interconnected spherical pore network," Tissue Engineering 7(1): 23-33 (2001), the disclosure of which is incorporated herein by reference in its entirety. 0.4 g paraffin spheres of selected size (diameter range: 150-250 µm, 250-420 µm, or 420-600 µm) were added to Teflon molds (cylindrical vials with a diameter of 18 mm), and the top surface was leveled. The molds were then preheated at 37° C. for 20, 40, 80, or 200 minutes to ensure that paraffin spheres were substantially adhered to each other. Solutions of various concentrations were prepared. For example, to prepare 5% gelatin solution, 1 g gelatin was dissolved in 10 mL water and 10 mL ethanol solvent mixture at 45° C. 0.35 mL gelatin solution was cast onto the paraffin sphere assemblies. The gelatin/paraffin composite was quickly transferred into a freezer at a preset temperature (e.g., −76, −18, 4° C.) or under room temperature to induce phase separation for 4 hours or longer.

The gelatin/paraffin composite was then soaked in 50 mL cold ethanol (−18° C.) for 24 h. The composite was then transferred into 50 mL 1,4-dioxane for solvent exchange for 24 h with fresh 1,4-dioxane replaced every 8 h. The composite was then kept in a freezer at −18° C. for 12 h to be completely frozen. The frozen composite was freeze-dried in an ice/salt bath for 4 days followed by vacuum drying at room temperature for 3 days.

The gelatin/paraffin composite was cut into discs with 2.0 mm thickness. The composite was soaked in 50 mL hexane to leach out paraffin spheres. Hexane was changed every 12 h for at least 6 times. To accelerate the dissolution of paraffin spheres, the process of dissolving paraffin may be carried out in an oven at 37° C. Cyclohexane was used for solvent exchange. The gelatin scaffold was frozen at −18° C. for 12 hours and freeze-dried at between −10° C. and −5° C. in an ice/salt bath for 4 days followed by vacuum drying at room temperature for 3 days.

Solid-walled gelatin scaffolds were also prepared by using a similar procedure except that the gelatin/paraffin composite was air-dried and no solvent extraction was applied.

Example 3

Chemical Crosslinking of 3D Nano-Fibrous and Macroporous Gelatin Matrices

Chemical crosslinking of 3D gelatin scaffold using 1-ethyl-3-(3-dimethylaminopropyl)carbodiimide HCl (EDC) and N-hydroxy-succinimide (NHS) was carried out in {2-[N-morpholino]ethanesulfonic acid}hydrate (MES) buffer (pH 5.3, 0.05 M) at 4° C. for 24 h. To maintain the microstructures of gelatin matrices and prevent the swelling of gelatin matrices in water, 90/10 (v/v) dioxane/water (or 90/10 (v/v) acetone/water) solvent mixtures were chosen instead of water. In detail, 0.122 g MES was dissolved in 5 mL double distilled water and the buffer solution temperature was adjusted to 4° C. 0.0115 g NHS and 0.096 g EDC were added to the buffer solution. 45 mL dioxane (or acetone) was added after NHS and EDC were dissolved. Gelatin scaffold samples (about 50 mg) were then added to the solution for chemical crosslinking for 24 h. The solution temperature was controlled at 4° C. during the reaction. The scaffolds were then washed with distilled water at 37° C. three times and were frozen at −18° C. for at least 12 h. The chemically crosslinked scaffolds were freeze-dried for 4 days and vacuum dried at room temperature for 3 days. The dried gelatin foam was then stored in a desiccator for later use.

Example 4

Surface Coating of Nano-Fibrous PLLA Scaffolds Using a Self-Assembly Process

PLLA scaffolds were first wetted in ethanol solution for 2 h and rinsed to remove possible surface contaminants. A series of water/ethanol solvent mixtures (30/70, 50/50, 70/30, 80/20, 90/10, and 100/0) were used for solvent exchange. The PLLA scaffolds were then soaked in Milli-Q water ($\Omega$>18.2 M$\Omega$-cm) for 2 days before self-assembly process began.

The pretreated PLLA scaffolds were first activated in an aqueous poly(diallyldimethylammonium chloride) (PDAC) solution at a concentration of 1.0 mg/mL for 60 min to obtain stable positively charged surfaces. After being washed with water for 60 seconds, the scaffolds were dipped in 1.0 mg/mL gelatin solution (pH=7.68) for 20 min and then washed with water for 60 seconds. The scaffolds were again exposed to PDAC solution for 20 min. After the same washing procedure as above, the scaffolds were dipped in gelatin solution for 20 min and rinsed with water again. The additional coating of PDAC/gelatin bilayers was accomplished by the repetition of the same cycle of immersion in PDAC, rinsing with water, immersion in gelatin solution, and rinsing with water.

After the desired number of bilayers were deposited and washed with water, the PDAC/gelatin was fixed by crosslinking gelatin with EDC and NHS in MES buffer at 4° C. for 24 h. After being rinsed with water at 37° C. for 60 min, the scaffold surfaces were blotted with filtered paper and then transferred into a freezer set to −18° C. and kept for 4 h. The surface-modified scaffolds were then freeze-dried for 5 days.

Example 5

Surface Coating of Nano-Fibrous PLLA Scaffolds Using an Entrapment Process

PLLA scaffolds were first soaked in ethanol for 2 h, and then washed with double distilled water. Gelatin was dissolved in dioxane/water solvent mixture at 45° C. The pretreated PLLA scaffolds were immersed in the solution and soaked for a designated time, and then moved out and quickly put into 200 mL ice-water mixture for 10 min. Chemical crosslinking of gelatin with EDC and NHS was carried out in MES buffer at 4° C. for 24 h. The scaffolds were then washed with distilled water at 4° C. for 3 times, followed by rinsing in water at 40° C. for 12 h (water was changed every 3 h) to ensure the removal of un-entrapped gelatins. The surface-modified scaffolds were freeze-dried for 3 days, and then vacuum dried at room temperature for 2 more days.

Example 6

Scanning Electron Microscopy (SEM) Examination

The morphology of the scaffolds was observed using SEM (Philips XL30 FEG). The scaffolds were coated with gold using a sputter coater (DeskII, Denton vacuum Inc). During the process of gold coating, the gas pressure was kept at 50 mtorr, and the current was 40 mA. The coating time was 200 s. Samples were analyzed at 10 kV.

Example 7

Mechanical Testing

The compressive moduli of PLLA scaffolds were measured using an MTS Synergie 200 mechanical tester (MTS Systems Corporation, Eden Prairie, Minn.). For compressive testing, the specimens were circular discs about 17 mm in diameter and 3.0 mm in thickness. The crosshead speed was 0.5 mm/min and the compressive modulus was defined as the initial linear modulus. Six specimens were tested for each sample. The averages and standard deviations were graphed. To compare mechanical properties, a two-tailed Student's t-test (assuming equal variances) was performed to determine the statistical significance (p<0.05).

Example 8

Surface Area Measurement

The surface area of nano-fibrous gelatin scaffold was measured using a BELSORP-mini gas adsorption instrument (BEL Japan, Inc.). At least 0.1 g sample was used for each measurement, and BET method was used for calculation.

Example 9

Porosity

Porosity $\epsilon$ was calculated as:

$$\epsilon = 1 - D_p/D_0$$

Where $D_p$ is the overall density of gelatin foam, and $D_0$ is the density of gelatin. $D_p$ was determined by:

$$D_p = \frac{4m}{\pi d^2 h}$$

Where m was the mass, d was the diameter, and h was the thickness of the foam. For the gelatin we used (Type B: from calf skin, Approx. 225 Bloom), $D_0 = 1.35$ g/cm$^3$.

Example 10

Swelling Ratio

Swelling ratio $\omega$ was defined as:

$$\omega = W/W_0$$

where W was the actual weight of gelatin foam in solution, and $W_0$ was the original dry weight. The surface of samples was blotted with filter paper when the samples were taken out from solution. For equilibrium swelling ratio $\omega_e$, the scaffold samples were soaked in the solution for 2 h before measurement. All data were presented as means ±standard deviation (SD). To test the significance of observed differences between the study groups, an unpaired Student's t-test was applied. A value of $p<0.05$ was considered to be statistically significant.

Example 11

Gelatin/Water System

Gelatin was dissolved in double distilled water to form different concentrations of gelatin solutions (e.g. 2% or 5% (g/mL)). The gelatin solution temperature was balanced at 50° C. in a water bath. 2 mL gelatin solution was added to a Teflon vial and capped. The Teflon vial with gelatin solution was quickly transferred to a freezer at −76° C. (or −18° C.). The gelation of gelatin solution occurred and the gel was kept at the temperature for at least 2 hours. The frozen gelatin gel was freezing-dried at ice-salt bath at −5° C. to −10° C. for one week.

Porous gelatin foam was created with a pore size ranging from 50 µm to 500 µm. Decreasing gelation temperature led to the decrease of average pore size. Most of pores were irregular closed pores. The surface of pore wall was smooth with no specific microstructure observed (FIG. 1).

Example 12

Gelatin in Acetone/Water Mixture

The procedure was similar to that for preparing gelatin foams with water except that acetone/water solvent mixture was utilized instead of water. The acetone/water mixture composition ranges from 5/95 to 30/70 (v/v).

Figure 2:
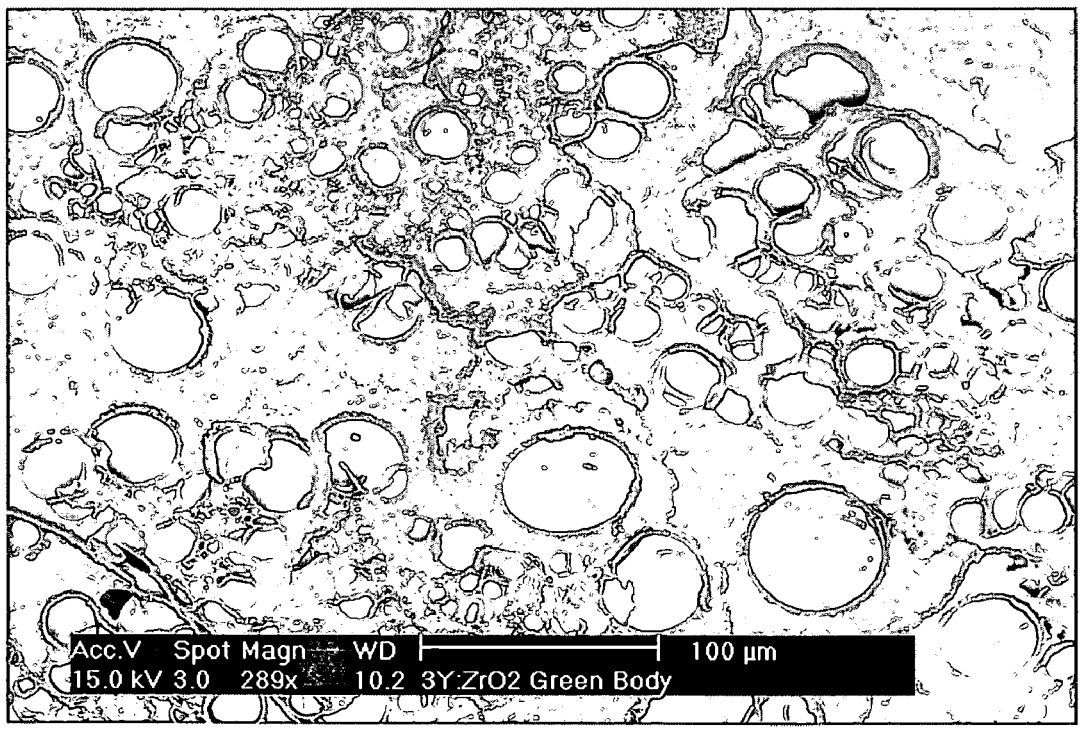
FIG. 2 is a SEM micrograph of a porous material formed from a 5% gelatin in 20/80 (v/v) acetone/water solvent mixture, dissolved at 50° C. and gelled at −76° C.

Gelatin foams were created with pore size ranging from 10 µm to 50 µm. Thick pore walls (10 µm to 50 µm) and uneven pore distribution were observed. Most of pores were round close pores. The surface of pore wall was smooth with no special microstructures (FIG. 2).

Example 13

Gelatin in Dioxane/Water Mixture

The procedure was similar to that of preparing gelatin foams with water except that dioxane/water solvent mixture was utilized instead of water. The dioxane/water mixture composition ranges from 5/95 to 40/60 (v/v).

Figure 3:
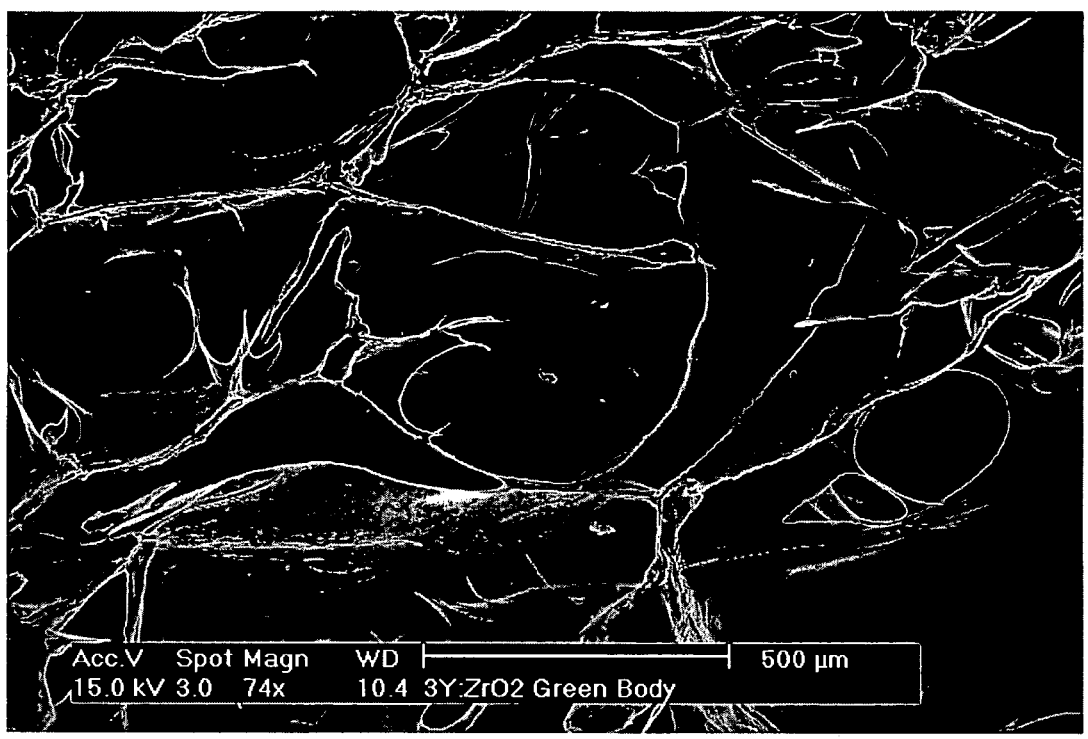
FIG. 3 is a SEM micrograph of a porous material formed from a 5% gelatin in 20/80 (v/v) dioxane/water solvent mixture, dissolved at 50° C. and gelled at −76° C.

Gelatin foams were created with pore size ranging from 50 µm to 500 µm. Increasing the ratio of dioxane in solvent mixture led to the decrease of pore size. Most of pores were irregular close pores. The surface of pore wall was smooth with no specific microstructure was observed (FIG. 3).

Example 14

Gelatin in Ethanol/Water Mixture

Gelatin was dissolved in ethanol/water solvent mixture to form different concentrations of gelatin solutions (from 2% (m/v) to 20% (m/v)). The gelatin solution temperature was balanced in a water bath (temperature ranges from 40° C. to 80° C.). 2 mL gelatin solution was added to a Teflon vial and capped. The Teflon vial with gelatin solution was quickly transferred to a freezer at −76° C., −18° C., 4° C., or left at room temperature. The gelatin solution was maintained at the desired temperature (gel formation) for at least 4 hours. The gelatin gels were soaked in 50 mL cold ethanol (−18° C.) for 24 h. The gels were then transferred into 50 mL dioxane for solvent exchange. Dioxane on the surface of the gelatin gel was wiped with blotting paper and the gel was frozen at −18° C. for at least 12 h. The gel was freeze-dried in an ice/salt bath at −5° C. to −10° C. for one week.

Figure 4:
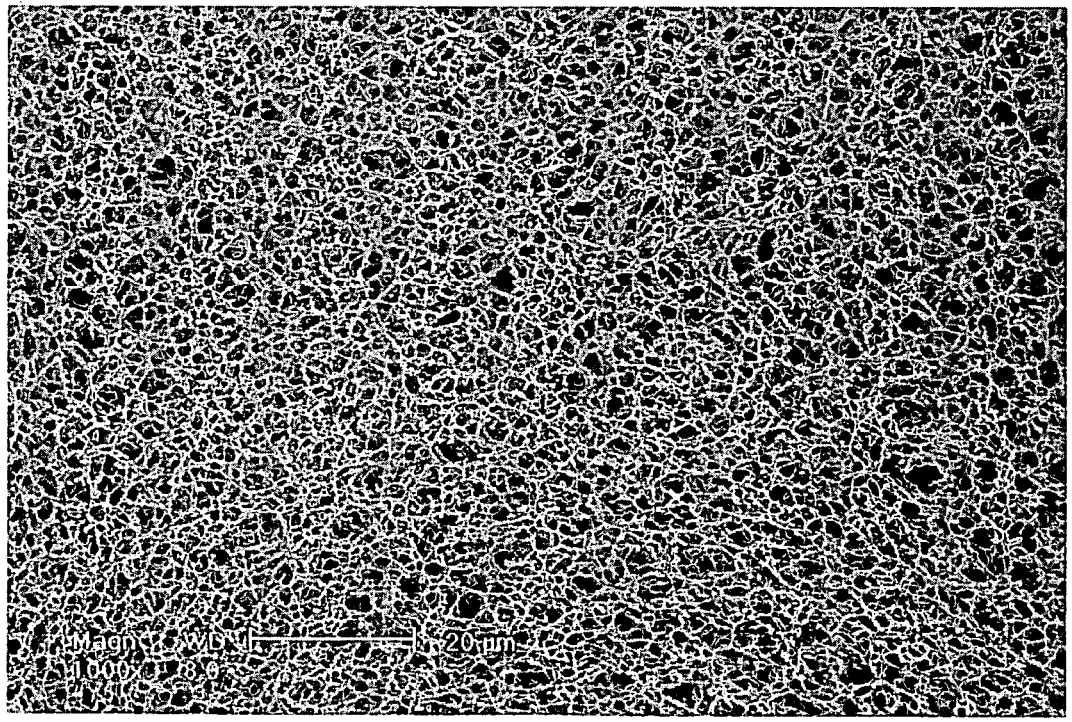
FIG. 4 is a SEM micrograph of a porous material formed from a 2.5% gelatin in 40/60 (v/v) ethanol/water solvent mixture, dissolved at 50° C. and gelled at −76° C.

Nano-fibrous gelatin microstructure was created with fiber diameters ranging from 50 nm to 500 nm. No macropores (>10 um) were observed inside the gelatin foam (FIG. 4).

Example 15

Gelatin in Methanol/Water Mixture

The procedure was similar to that for preparing gelatin foams with ethanol/water except that methanol was utilized instead of ethanol. The methanol/water mixture composition ranges from 20/80 to 50/50 (v/v).

Figure 5:
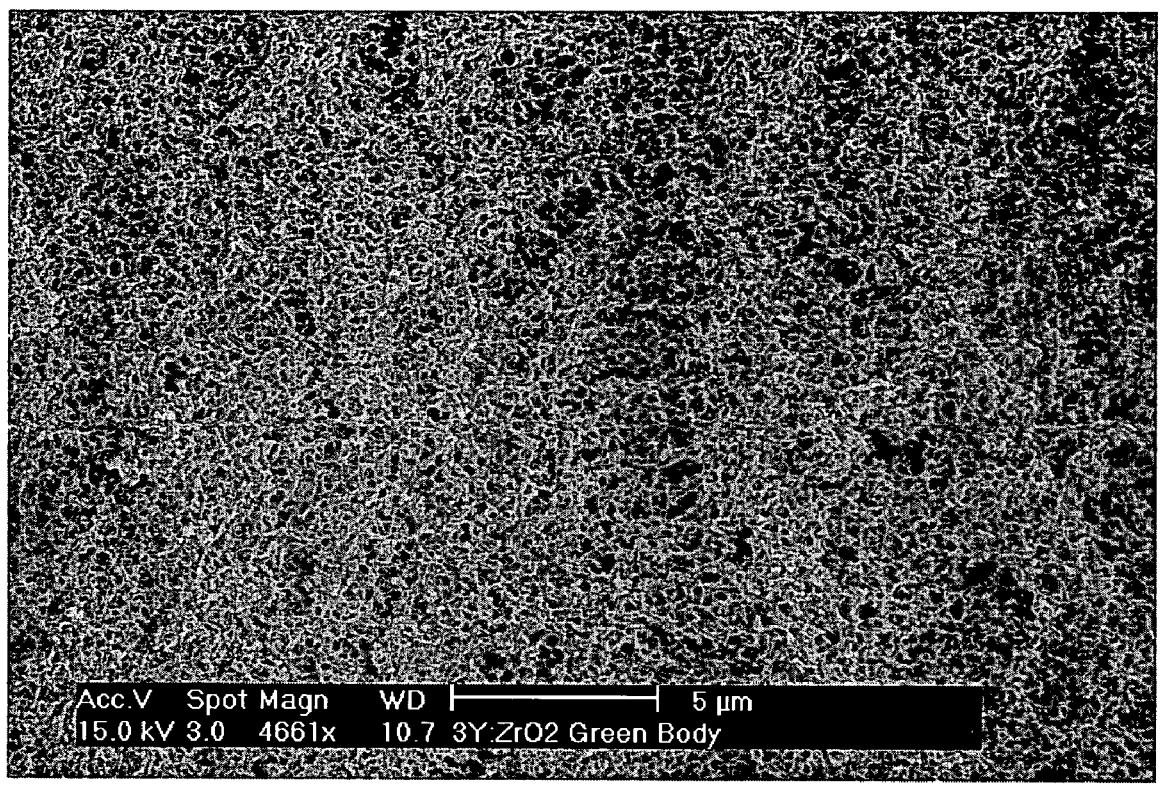
FIG. 5 is a SEM micrograph of a porous material formed from a 5% gelatin in 20/80 (v/v) methanol/water solvent mixture, dissolved at 50° C. and gelled at −76° C.
Figure 6A:
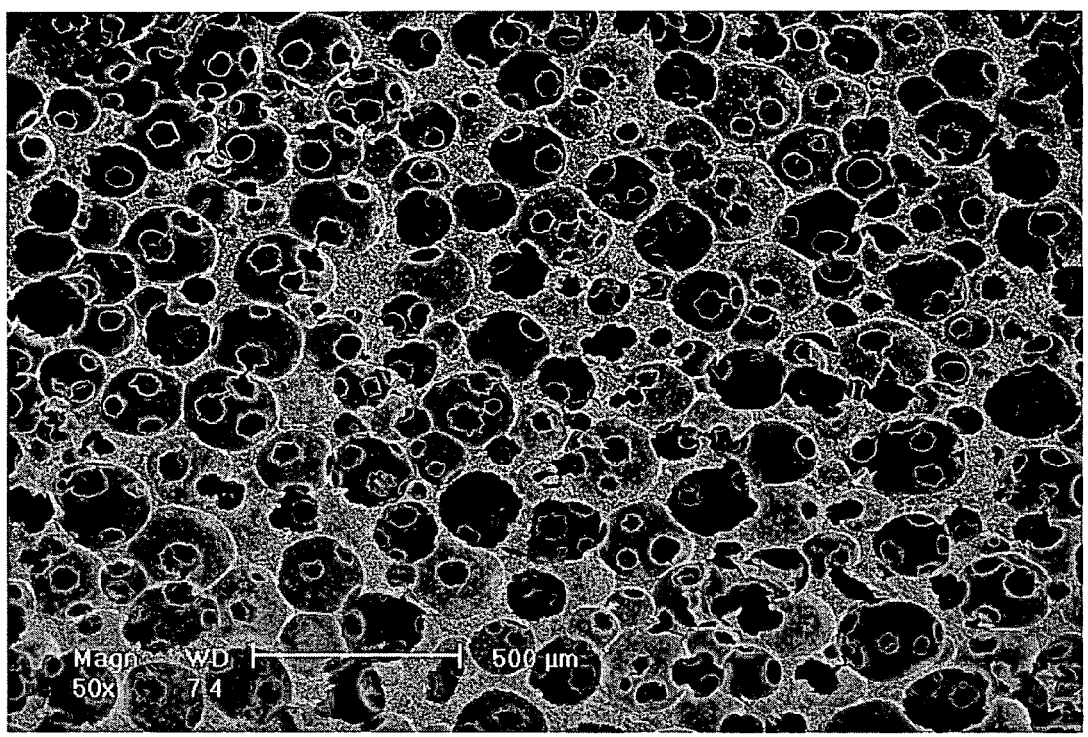
FIG. 6A is a SEM micrograph of macro-porous and nano-fibrous gelatin scaffolds prepared from a 50/50 ethanol/water solvent mixture and paraffin spheres at 50× magnification.
Figure 6B:
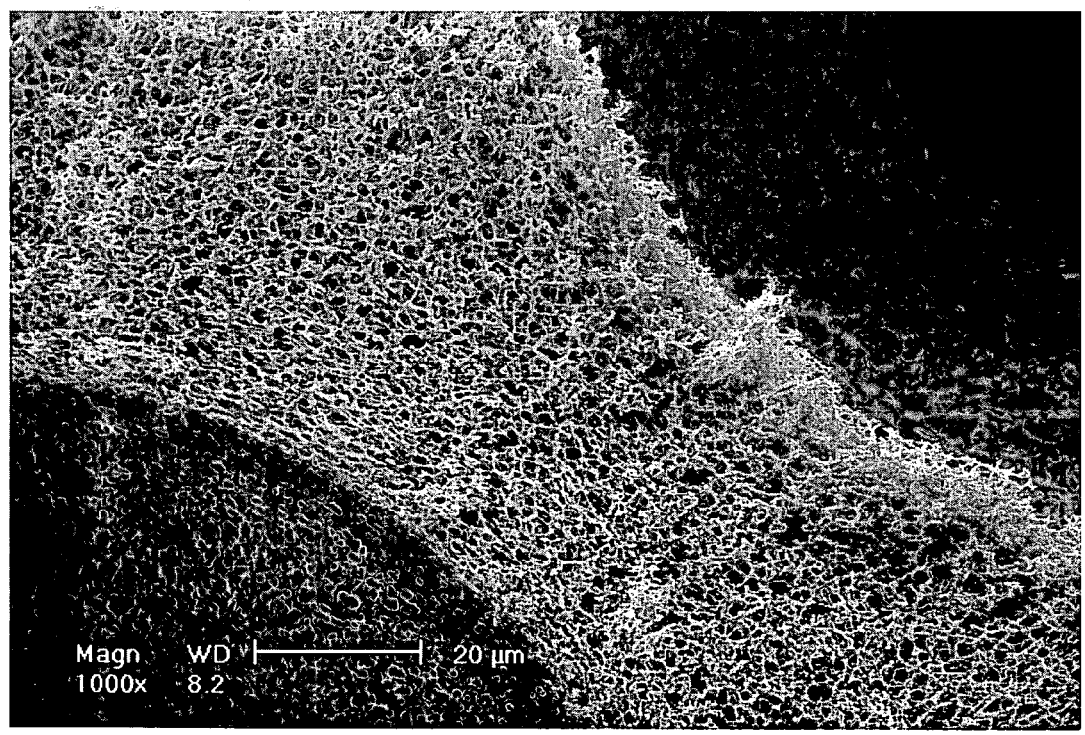
FIG. 6B is a SEM micrograph of macro-porous and nano-fibrous gelatin scaffolds prepared from a 50/50 ethanol/water solvent mixture and paraffin spheres at 1000× magnification.
Figure 6C:
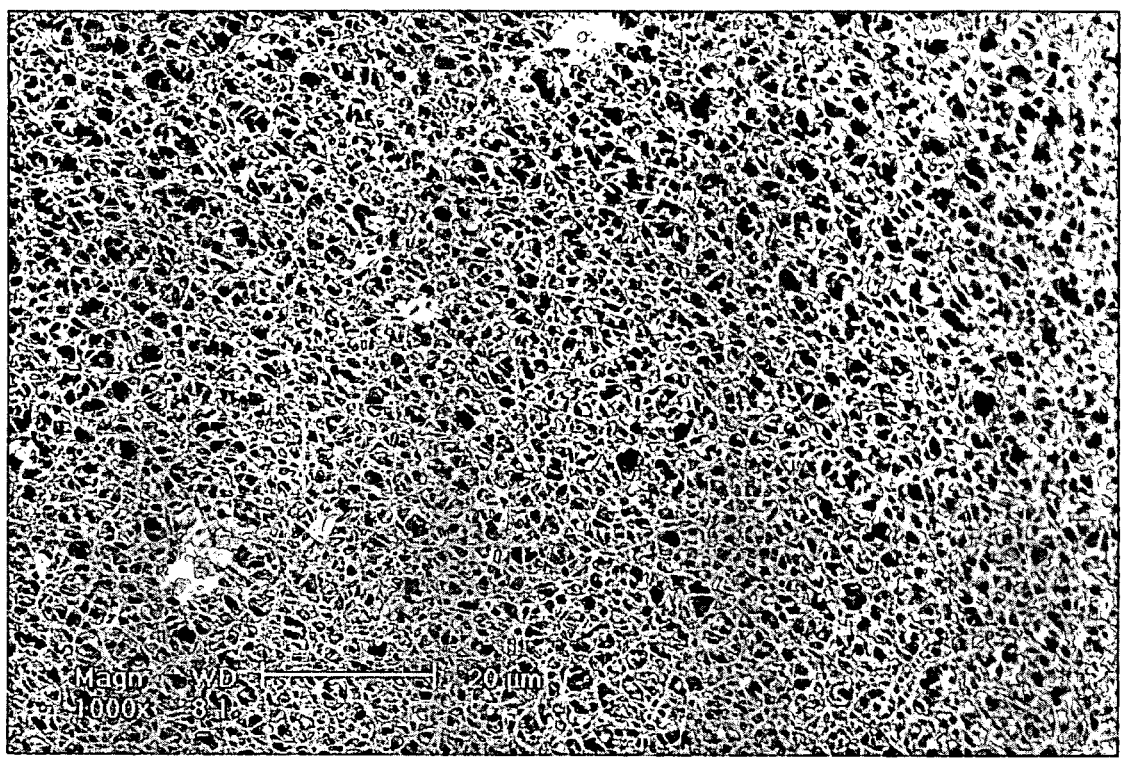
FIG. 6C is a SEM micrograph of macro-porous and nano-fibrous gelatin scaffolds prepared from a 50/50 ethanol/water solvent mixture and paraffin spheres at 1000× magnification.
Figure 6D:
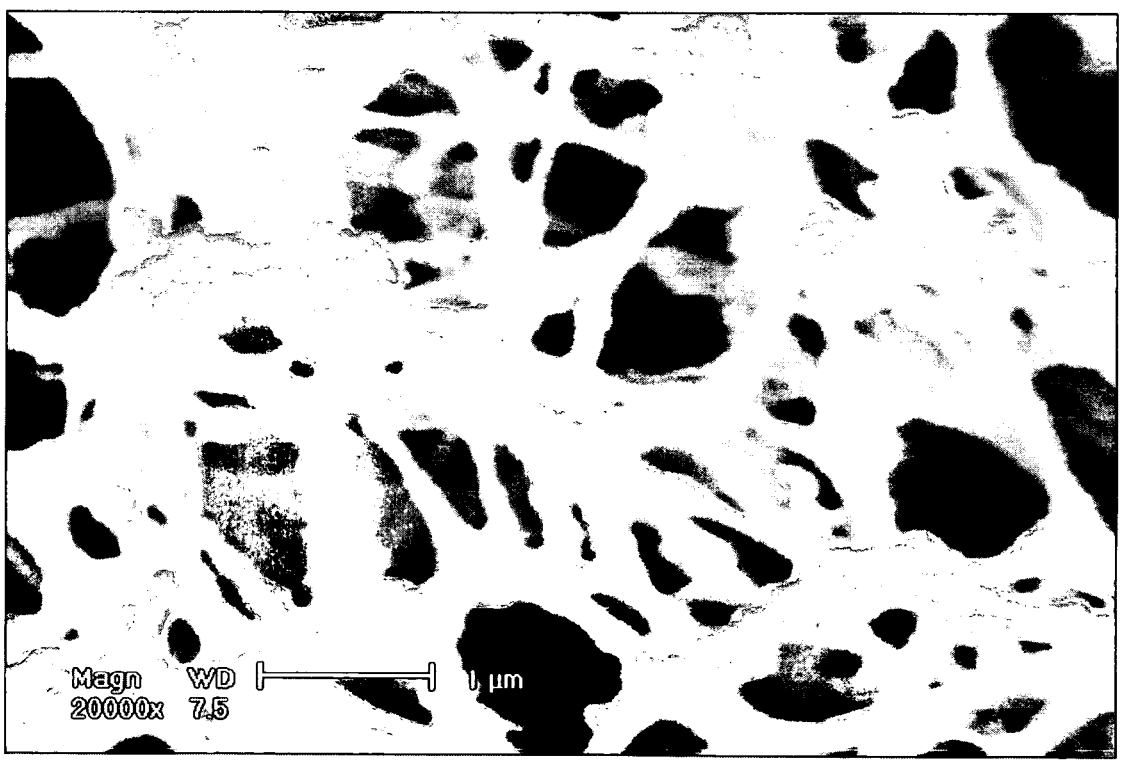
FIG. 6D is a SEM micrograph of macro-porous and nano-fibrous gelatin scaffolds prepared from a 50/50 ethanol/water solvent mixture and paraffin spheres at 20,000× magnification.

Nano-fibrous microstructure was obtained with the methanol/water solvent mixture composition ranging from 20/80 (v/v) to 50/50 (v/v). Lower gelation temperature leads to more typical nano-fibrous structure, while only agglomerates were observed in foams prepared at room temperature. The increase of gelatin solution concentration led to increase of network density of the gel. No macropores (>10 um) were observed inside the gelatin foam (FIG. 5).

Example 17

Macroporous and Nano-Fibrous Gelatin Materials

Nano-fibrous gelatin scaffolds with designed macropores were fabricated by combining particulate-leaching technique and phase-separation techniques (see Example 2). The matrices have very high porosity (Table 1). The porosity decreased with increasing gelatin concentration. Porosity as high as 98% was obtained when gelatin concentration was 5%. The fiber diameter ranged from 50 nm to 500 nm. The average fiber diameter did not statistically change with gelatin concentration. It is also worth noticing that the fiber diameter of the scaffolds became more uniform as the gelatin solution increased.

SEM images demonstrated the interconnected open pore structure and nano-fibrous pore walls (FIG. 6). There were three size scales involved in these gelatin scaffolds, that is, the macropore size, interfiber distance, and fiber diameter. The macropores were a few hundred micrometers in size determined by paraffin sphere size. The interfiber distance, which ranged from several hundred nanometers to tens of micrometers, was determined by the gelatin solution concentration.

Example 18

Figure 7A:
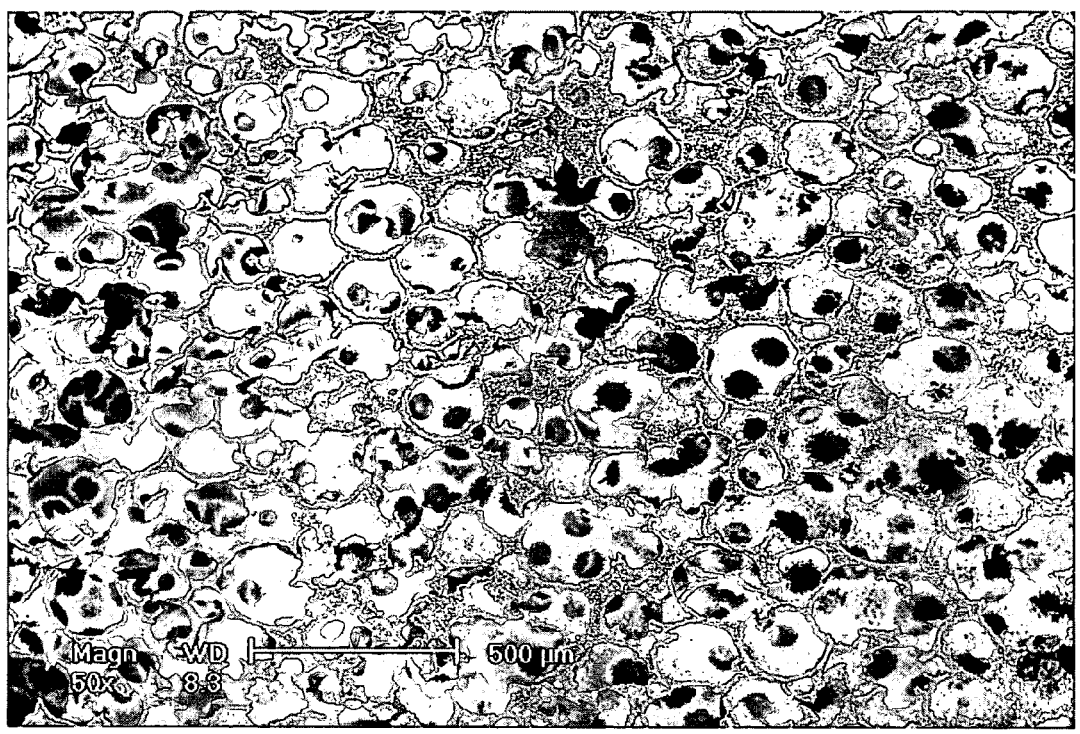
FIG. 7A is a SEM micrograph of a nano-fibrous gelatin scaffold fabricated from a 5% (wt/v) ethanol/water (v/v=50/50) solution, and paraffin spheres were heat treated at 37° C. for 25 min, having a paraffin sphere size, d=150-250 μm.
Figure 7B:
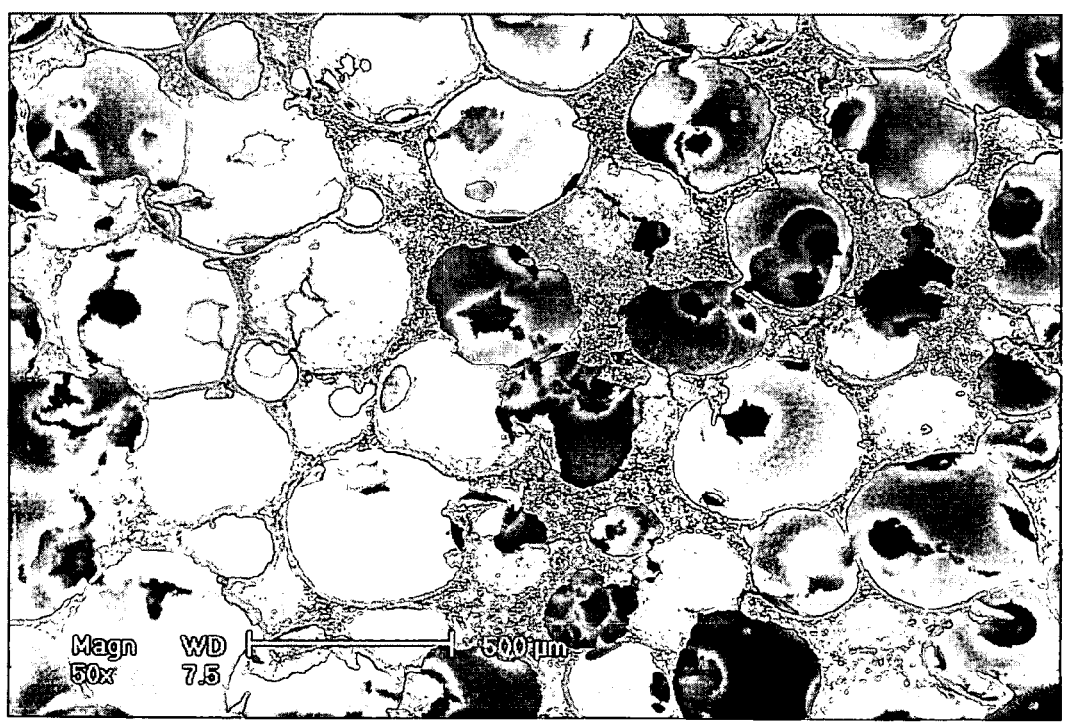
FIG. 7B is a SEM micrograph of a nano-fibrous gelatin scaffold fabricated from a 5% (wt/v) ethanol/water (v/v=50/50) solution, and paraffin spheres were heat treated at 37° C. for 25 min, having a paraffin sphere size, d=420-500 μm.
Figure 8A:
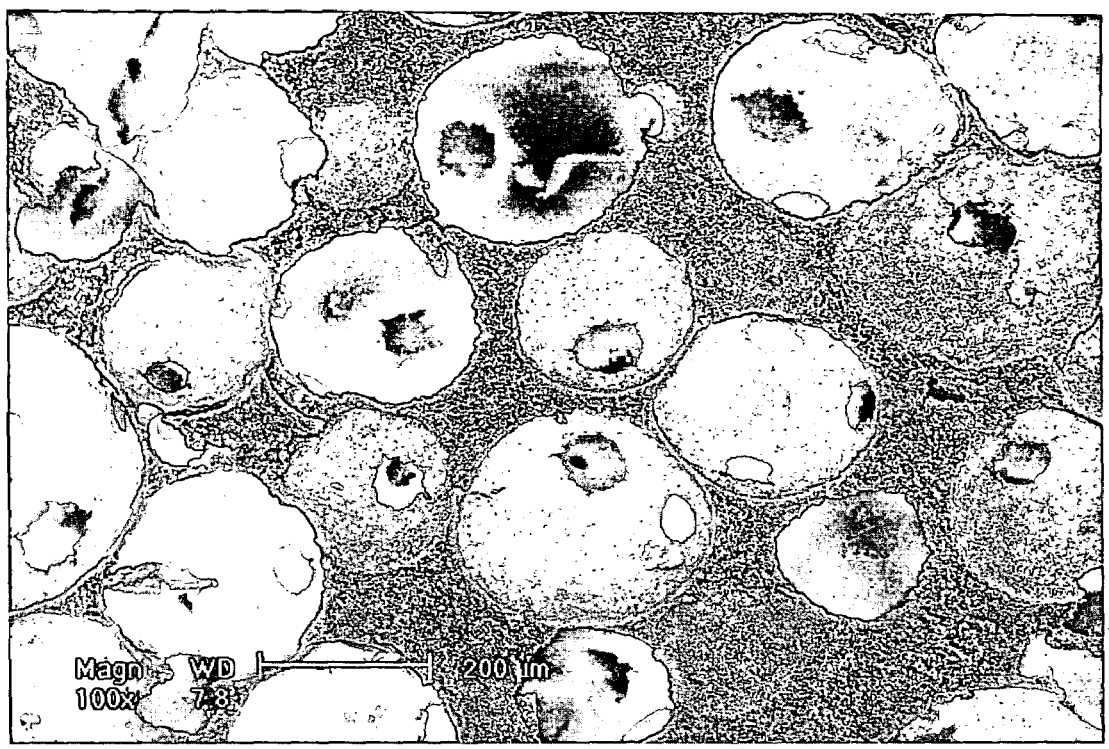
FIG. 8A is a SEM micrograph of a nano-fibrous gelatin scaffold fabricated from a 5% (wt/v) ethanol/water (v/v=50/50) solution, with paraffin spheres heat-treated for 20 min.
Figure 8B:
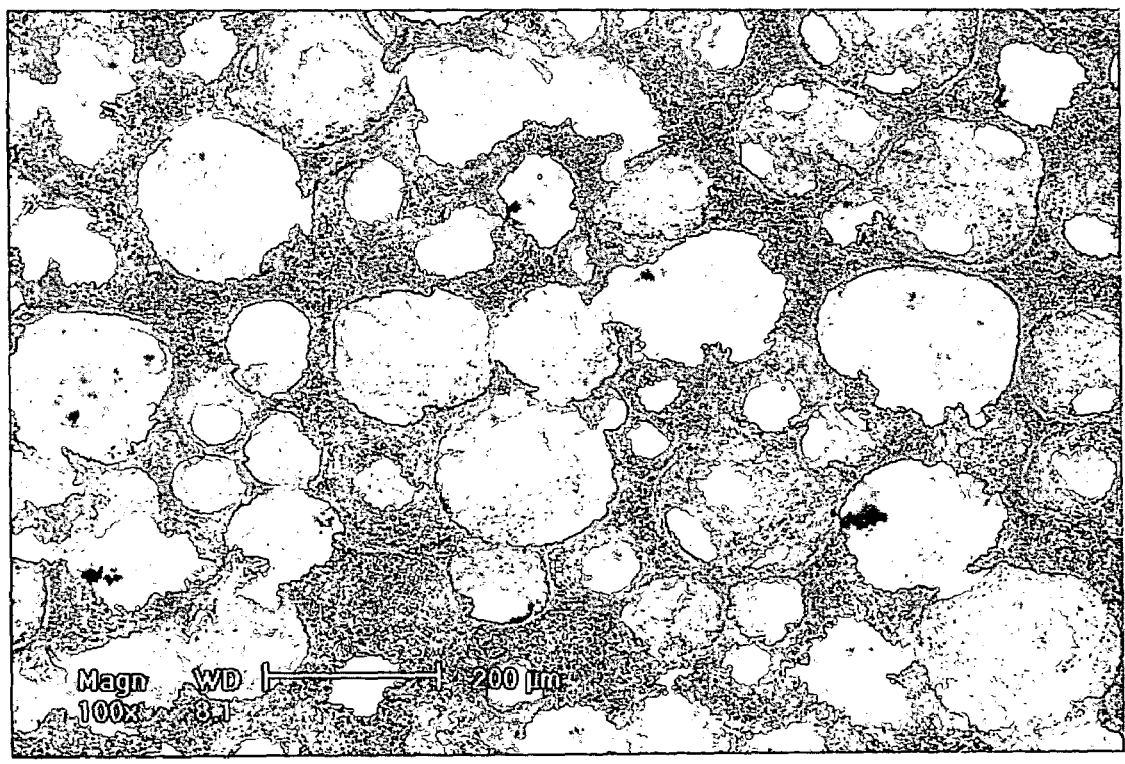
FIG. 8B is a SEM micrograph of a nano-fibrous gelatin scaffold fabricated from a 5% (wt/v) ethanol/water (v/v=50/50) solution, with paraffin spheres heat-treated for 40 min.
Figure 8C:
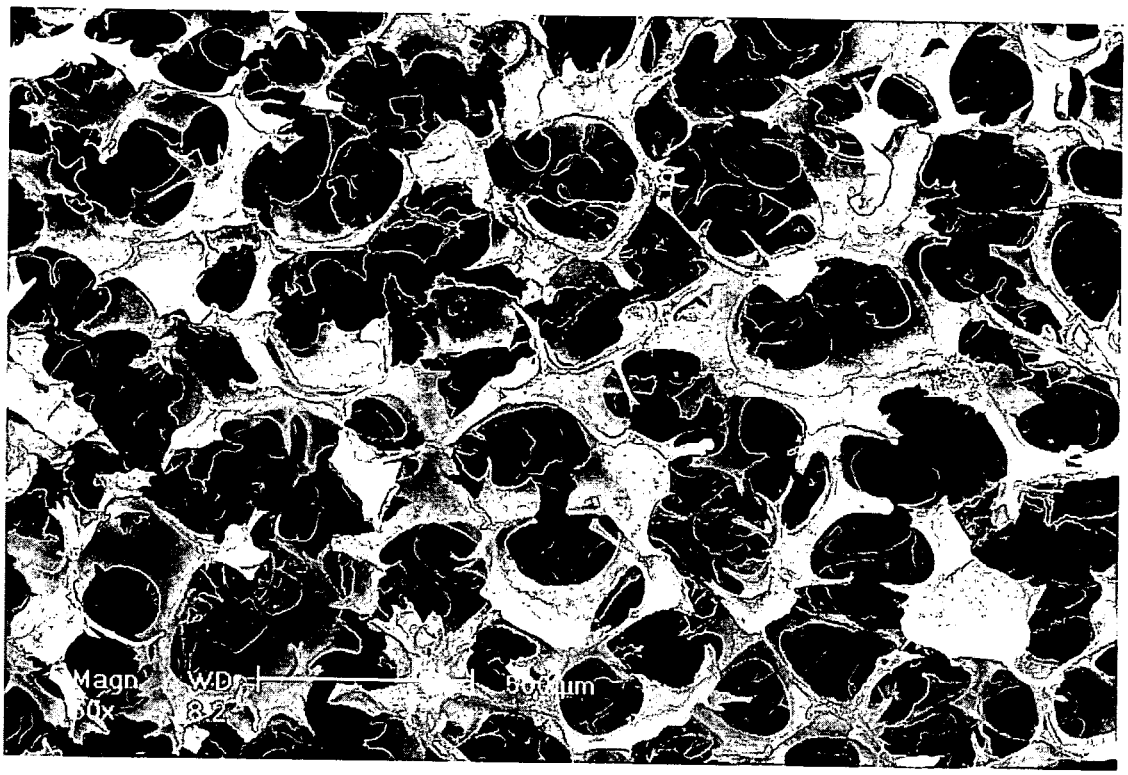
FIG. 8C is a SEM micrograph of a nano-fibrous gelatin scaffold fabricated from a 5% (wt/v) ethanol/water (v/v=50/50) solution, with paraffin spheres heat-treated for 200 min.

Varying Macropore Size and Inter-Pore Connectivity of Nano-Fibrous Gelatin Materials Using different paraffin sphere size, one can obtain gelatin scaffolds with different macropore sizes (FIG. 7). The interconnectivity between the pores of the gelatin scaffold was controlled by varying the heat treatment time of paraffin spheres (FIG. 8). The longer time of heat treatment, the larger bonding areas between the spheres, and therefore higher interconnectivities between the macropores.

Example 19

Surface Area Analysis

Macro-porous and nano-fibrous gelatin scaffolds (7.5%, 250-420 μm paraffin spheres) had a surface area of 32.02 (m$^2$/g) as measured using method described earlier (Example 8).

Figure 12:
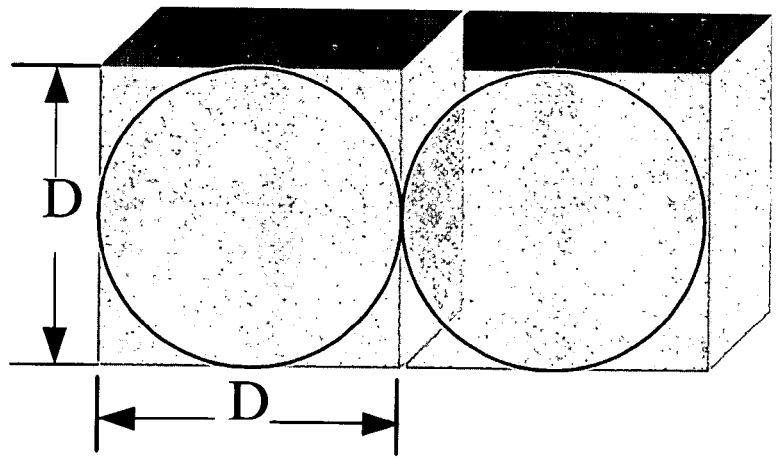
FIG. 12 is a schematic illustration of the pore structure.

Macro-porous solid-walled gelatin scaffolds (7.5%, 250-420 μm paraffin spheres) had a surface area too low to be measured using the instrument. A theoretical calculation was used to estimate the surface area (we assumed that the pores were closely contacted as illustrated in FIG. 12):

Total mass of the scaffold: $M = nD_p V$ (1)

Volume of one pore:

$$V = D^3 - \frac{1}{6}\pi D^3$$ (2)

Surface area of one pore:

$$S = \frac{n}{4}\pi D^2$$ (3)

where $D_p$=1.35 g/cm$^3$ for gelatin, D is the diameter of the pore (here the average value 300 μm was used), and n was the numbers of pores.

Combining equation (1), (2), and (3), the surface was derived:

$$S = \frac{1}{4}\left(\frac{M}{D_p V}\right)\pi D^2 = \frac{1}{4}\left[\frac{M}{D_p\left(D^3 - \frac{1}{6}\pi D^3\right)}\right]$$

$$\pi D^2 = \frac{\pi}{4}\left[\frac{M}{(1-\pi/6)D_p D}\right]$$

When M=1.0 g, then $$S = \frac{3.14}{4}\left[\frac{10^{-3}}{(1-3.14/6)\times(1.35\times 10^3)\times(300\times 10^{-6})}\right]$$

$$= 4.07\times 10^{-3}(m^2/g)$$

The pores were actually interconnected (not closely contacted), some surfaces of the pores were overlapped. Therefore, the real surface area of solid-walled scaffold would be less than the above estimation if the surfaces were entirely smooth as observed under SEM.

$$S_{nano}/S_{solid} > 32.02/(4.07\times 10^{-3}) = 7.9\times 10^3$$

The surface area of nano-fibrous scaffold was more than 3 orders of magnitude higher than that of solid-walled scaffold.

Example 20

Mechanic Properties of Gelatin Foams

Figure 9:
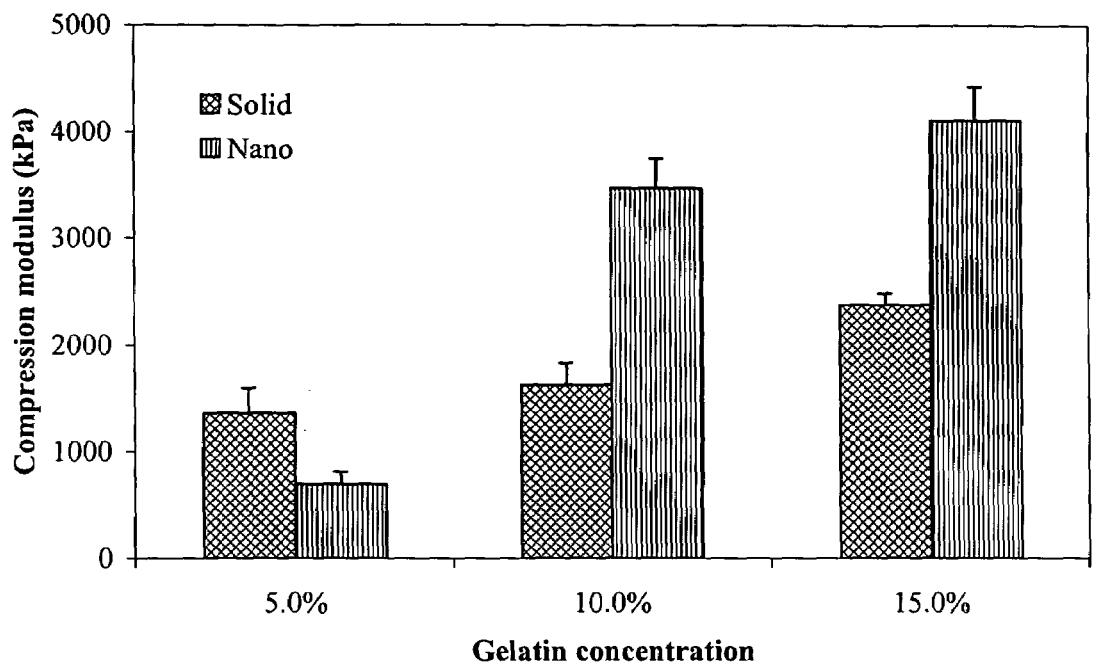
FIG. 9 is a chart showing compressive modulus of solid-walled and nano-fibrous gelatin foams prepared with different gelatin concentrations.
Figure 10:
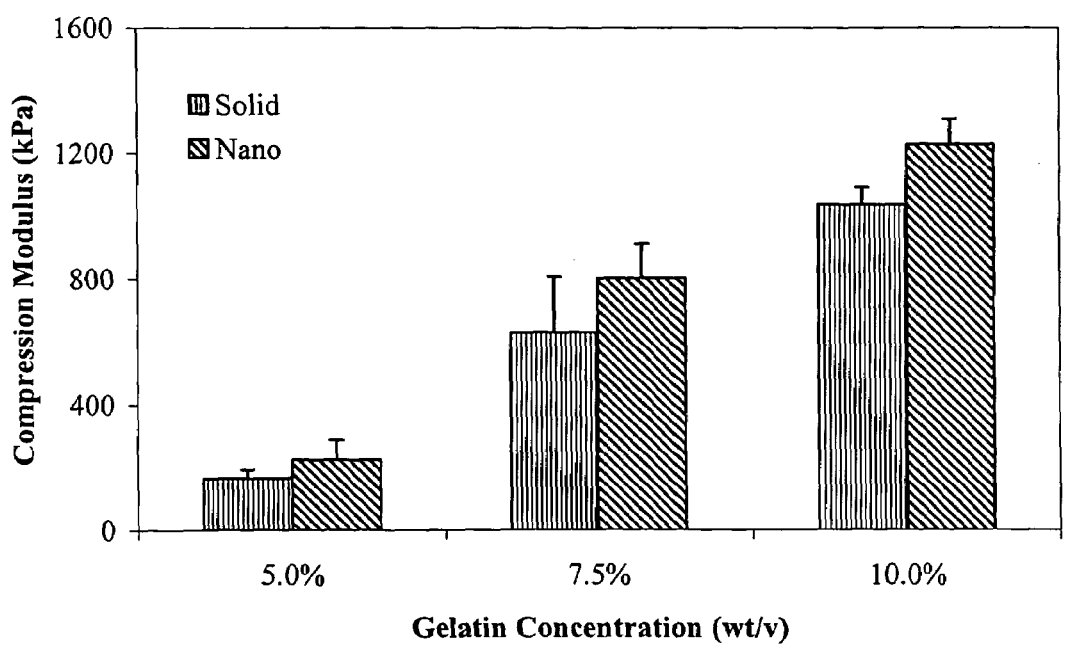
FIG. 10 is a chart showing compressive modulus of macro-porous solid-walled and nano-fibrous gelatin scaffolds prepared with different gelatin concentrations.

The compression modulus of solid-walled gelatin foam was higher than that of nano-fibrous gelatin foam at the concentration of 5.0%. However, the modulus of nano-fibrous gelatin foam increased much faster than that of solid-walled gelatin foam as gelatin concentration increased, and the compression modulus of nano-fibrous gelatin foam was significantly higher than that of solid-walled gel foam as the concentration increased to 10.0% or above (FIG. 9).

Example 21

Swelling Behavior of Macro-Porous Gelatin Scaffolds

Both solid-walled and nano-fibrous gelatin scaffolds had high volume swelling before they were chemical crosslinked (Table 2). After crosslinking, both solid-walled and nano-fibrous gelatin scaffolds could maintain their size and shape.

Example 22

Swelling Behavior of Macro-Porous PLLA Scaffolds

The PLLA scaffolds dissolve in $CH_2Cl_2$, $CHCl_3$ and Dioxane before their surfaces were coated with gelatin. After the surface was coated with gelatin, the PLLA scaffold could maintain its original size in the above solvents (Table 3).

Example 23

Effect of Crosslinking on Gelatin Foam Morphology in Water

Figure 11A:
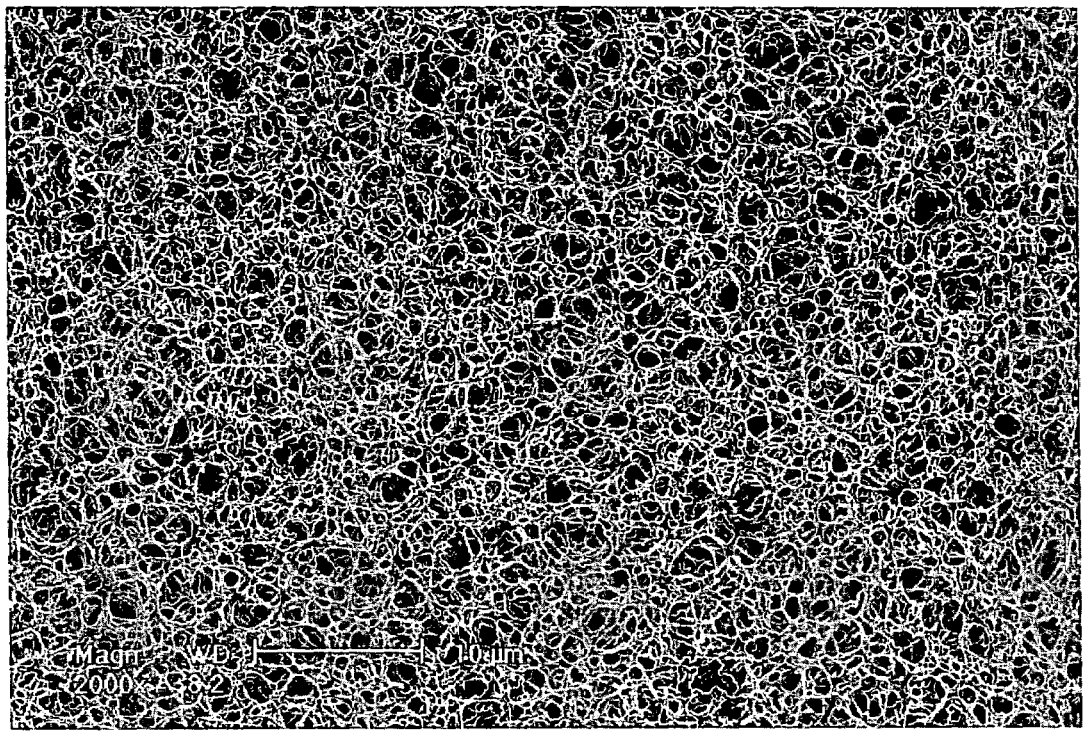
FIG. 11A is a SEM micrograph showing the surface morphology of nano-fibrous gelatin scaffolds.
Figure 11B:
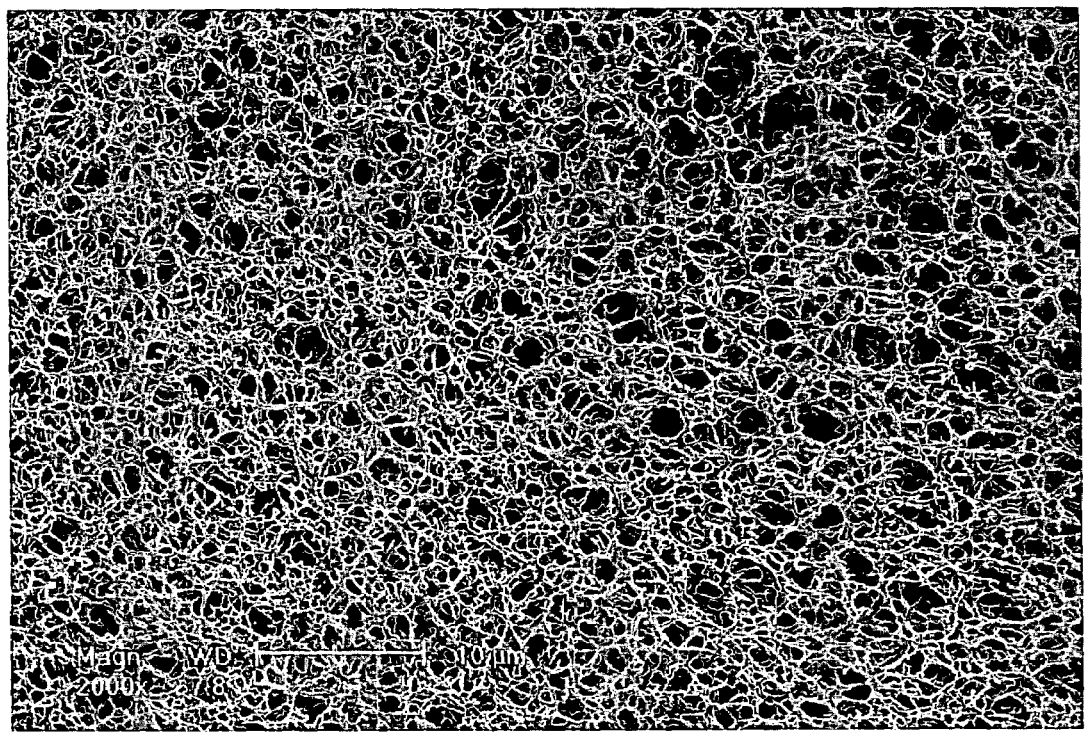
FIG. 11B is a SEM micrograph showing the surface morphology of the nano-fibrous gelatin scaffolds of FIG. 11A after crosslinking and immersion in water for 24 hours.

Nano-fibrous gelatin without crosslinking swelled enormously (Table 2) and lost the nano-fibrous feature upon immersion in water, while crosslinked nano-fibrous microstructure maintained its size and nano-fibrous structure (Table 2 and FIG. 11).

TABLE 1

Structural parameters of macro-porous and nano-fibrous gelatin scaffolds prepared using varying gelatin concentrations.

| Gelatin concentration (%) | Fibers diameter (nm) | Porosity (%) |
|---|---|---|
| 5.0 | 177 ± 62 | 98.06 ± 0.07 |
| 7.5 | 161 ± 45 | 97.51 ± 0.03 |
| 10.0 | 109 ± 31 | 96.45 ± 0.19 |

TABLE 2

Volume ratio ($V/V_0$) of gelatin scaffolds in water (measured after immersion in water for 24 h). The chemical crosslinking was carried out in an acetone/water mixture (90/10).

| | | $V/V_0$ (%) | Description |
|---|---|---|---|
| Solid-walled scaffold | Before crosslinking | 169.3 ± 38.2 | Very difficult to handle |
| | After crosslinking | 101.8 ± 2.9 | Easy to handle, maintain the form when handling |
| Nano-fibrous scaffold | Before crosslinking | 177.8 ± 34.9 | Very difficult to handle |
| | After crosslinking | 101.2 ± 1.8 | Easy to handle, maintain the form when handling |

TABLE 3

Volume ratio ($V/V_0$) of PLLA scaffolds in different organic solvents (measured after immersion for 24 h).

| | | Solvents | | |
|---|---|---|---|---|
| | | $CH_2Cl_2$ | $CHCl_3$ | Dioxane |
| Surface modified (Yes/No) | Yes | 101.2 ± 2.1 | 99.2 ± 1.7 | 100.9 ± 1.1 |
| | No | Dissolved immediately (<2 s) | Dissolved immediately | Dissolved slowly |

While several embodiments have been described in detail, it will be apparent to those skilled in the art that the disclosed embodiments may be modified. Therefore, the foregoing description is to be considered exemplary rather than limiting.

What is claimed is:

1. A method of modifying porous materials having interconnected, complexly shaped three-dimensional surfaces, the method comprising the step of:
    pretreating the porous materials with an ethanol solution or a surface charge modifying agent; and
    stabilizing the pretreated porous materials by directly coating the three-dimensional surfaces with a layer of gelatin;
    wherein the porous materials are macro structures including at least one of nano-features, micro-features, and combinations thereof, and wherein the porous materials are substantially stable in a predetermined environment.

2. The method as defined in claim 1 wherein the gelatin coating layer ranges in thickness between about $10^{-10}$ meters and about $10^{-3}$ meters.

3. The method as defined in claim 2 wherein the gelatin coating layer ranges in thickness between about $10^{-9}$ meters and about $10^{-6}$ meters.

4. The method as defined in claim 1 wherein the porous materials comprise at least one of synthetic macromolecules; natural macromolecules; substantially non-macromolecular materials; natural macromolecule-containing materials; synthetic macromolecule-containing materials; oligomeric materials; fragments of macromolecules; macromolecule-containing composites; and mixtures thereof.

5. The method as defined in claim 4 wherein the macromolecule-containing composite has as a component thereof at least one of ceramic materials, metal materials, inert additives, active additives, and mixtures thereof.

6. The method as defined in claim 1, further comprising the step of crosslinking the gelatin coating layer, wherein the porous materials comprise at least one of: substantially non-macromolecular materials; natural macromolecules; synthetic macromolecules; natural macromolecule-containing materials; synthetic macromolecule-containing materials; oligomeric materials; fragments of macromolecules; and mixtures thereof.

7. The method as defined in claim 4 wherein the synthetic macromolecules are polymeric materials, and wherein the method further comprises the step of synthesizing the polymeric materials in situ.

8. The method as defined in claim 1 wherein the coating is accomplished by at least one of mechanical application; thermal application; adhering; self assembling; molecular entrapment; chemical bonding; and combinations thereof.

9. The method as defined in claim 1 wherein the gelatin coating layer is different from the porous materials.

10. The method as defined in claim 9 wherein the gelatin coating layer is not substantially stable in the predetermined environment, and wherein the method further comprises the step of crossliniking the gelatin coating layer, thereby rendering the gelatin coating layer substantially stable in the predetermined environment.

11. The method as defined in claim 9 wherein the porous materials are formed from biodegradable materials adapted for tissue regeneration.

12. The method as defined in claim 11 wherein the biodegradable materials are at least one of poly(L-lactic acid) (PLLA), polyglycolic acid (PGA), poly(lactide-co-glycolide) (PLGA), and mixtures thereof.

13. The method as defined in claim 9 wherein the porous materials comprise poly(L-lactic acid) (PLLA).

14. Modified porous materials formed by the process of claim 1.

15. The method as defined in claim 1 wherein the porous materials are pretreated with the ethanol solution, and wherein the method further comprises:
    dissolving the gelatin in a solvent mixture, thereby forming a gelatin solution;
    soaking the pretreated porous materials in the gelatin solution, thereby forming the gelatin coating layer; and
    cooling the coated porous materials.

16. The method as defined in claim 15 wherein the solvent mixture includes dioxane and water.

17. The method as defined in claim 15, further comprising chemically crossliniking the gelatin coating layer with ethyl-3-(3-dimethylaminopropyl) carbodiimide HCl and N-hydroxy-succinimide.

18. The method as defined in claim 1 wherein the porous materials are pretreated with the surface charge modifying agent, and wherein the surface charge modifying agent is poly(diallyldimethylammonium chloride).

19. The method as defined in claim 18 wherein the pretreatment results in the porous materials having positively charged surfaces, and wherein the method further comprises exposing the pretreated porous materials to a gelatin solution, thereby forming the gelatin coating layer.

20. The method as defined in claim 19, further comprising:
   treating the gelatin coating layer by exposing the porous materials having the gelatin coating layer thereon to poly(diallyldimethylammonium chloride); and
   exposing the treated porous materials to the gelatin solution, thereby forming a second gelatin coating layer.

21. A method of modifying porous materials having interconnected, complexly shaped three-dimensional surfaces, the method comprising the step of:
   pretreating the porous materials with an ethanol solution or a surface charge modifying agent; and
   accomplishing the modifying by directly coating the three-dimensional surfaces with a layer of gelatin
   wherein the porous materials are macro structures including at least one of nano-features, micro-features, and combinations thereof, and wherein the modifying accomplishes at least one of changing surface properties of the porous materials; and changing the three-dimensional surfaces.

22. The method as defined in claim 21, further comprising the step of crosslinking the gelatin coating layer.

23. The method as defined in claim 21 wherein the coating is accomplished by at least one of mechanical application; thermal application; adhering; self-assembling; molecular entrapment; chemical bonding; and combinations thereof.

24. Modified porous materials formed by the process of claim 21.

* * * * *